US011828416B2

(12) United States Patent
Sellen et al.

(10) Patent No.: US 11,828,416 B2
(45) Date of Patent: Nov. 28, 2023

(54) GAS CYLINDER VALVE WITH RADIALLY EXTENDING OPERATING HANDLE

(71) Applicant: Rotarex S.A., Lintgen (LU)

(72) Inventors: Stephan Sellen, Wehingen (DE); Philippe Schmitz, Steinsel (LU)

(73) Assignee: ROTAREX S.A., Lintgen (LU)

( * ) Notice: Subject to any disclaimer, the term of this patent is extended or adjusted under 35 U.S.C. 154(b) by 32 days.

(21) Appl. No.: 17/636,492

(22) PCT Filed: Aug. 14, 2020

(86) PCT No.: PCT/EP2020/072859
§ 371 (c)(1),
(2) Date: Feb. 18, 2022

(87) PCT Pub. No.: WO2021/032618
PCT Pub. Date: Feb. 25, 2021

(65) Prior Publication Data
US 2022/0290819 A1    Sep. 15, 2022

(30) Foreign Application Priority Data

Aug. 20, 2019 (LU) .................................. LU101358
Dec. 3, 2019 (LU) .................................. LU101513

(51) Int. Cl.
*F17C 13/04*      (2006.01)
*F16K 1/30*       (2006.01)
(Continued)

(52) U.S. Cl.
CPC .............. *F17C 13/04* (2013.01); *F16K 1/306* (2013.01); *F16K 1/307* (2013.01); *F16K 31/528* (2013.01);
(Continued)

(58) Field of Classification Search
CPC ...... F17C 2205/0323; F17C 2205/0385; F17C 2227/048; F17C 2223/0123;
(Continued)

(56) References Cited

U.S. PATENT DOCUMENTS 2,213,878 A    9/1940 Boyle
2,370,115 A    2/1945 Rice
(Continued)

FOREIGN PATENT DOCUMENTS

CA    2434561 A1    1/2005
DE    2946190 A1    11/1978
(Continued)

OTHER PUBLICATIONS

International Search Report for PCT/EP2020/072859 dated Oct. 14, 2020.
Written Opinion for PCT/EP2020/072859 dated Oct. 14, 2020.

*Primary Examiner* — Jessica Cahill
(74) *Attorney, Agent, or Firm* — Sandberg Phoenix & von Gontard PC

(57) ABSTRACT

A valve comprising a body with an inlet, an outlet and a passage fluidly interconnecting the inlet and outlet; a shut-off device of the passage, with an actuating member movable along a longitudinal axis; a hand operating device of the actuating member, for selectively opening or closing the passage, and comprising a support element and a rotating element with at least one contact surface configured for sliding along at least one ramped surface on the support element, or vice versa, so as to convert rotation of the rotating element into a translation of the actuating member; wherein the body comprises two arms extending longitudinally and diametrically opposed relative to the longitudinal axis, with distal ends holding the support element.

20 Claims, 10 Drawing Sheets

(51) Int. Cl.
*F16K 31/524* (2006.01)
*F16K 31/528* (2006.01)
*F16K 31/60* (2006.01)

(52) U.S. Cl.
CPC ........ *F16K 31/52408* (2013.01); *F16K 31/60* (2013.01); *F17C 2205/0323* (2013.01); *F17C 2205/0385* (2013.01); *F17C 2223/0123* (2013.01); *F17C 2227/048* (2013.01); *F17C 2250/043* (2013.01)

(58) Field of Classification Search
CPC .. F17C 2250/043; F16K 31/60; F16K 31/528; F16K 1/306; F16K 1/307; F16K 31/52408; F16K 13/04
See application file for complete search history.

(56) References Cited

U.S. PATENT DOCUMENTS

| | | | | |
|---|---|---|---|---|
| 2,592,673 | A * | 4/1952 | Folmsbee | F16K 31/52408 251/291 |
| 3,035,605 | A | 5/1958 | Ininnelt | |
| 2,918,976 | A * | 12/1959 | Peterson | A62C 13/003 251/263 |
| 3,396,939 | A * | 8/1968 | Hettich | F16K 31/528 251/332 |
| 6,126,046 | A * | 10/2000 | Baculy | B67D 3/043 251/238 |
| 2004/0231729 | A1* | 11/2004 | Lang | F16K 35/04 137/557 |
| 2008/0178610 | A1 | 7/2008 | Whitcher et al. | |
| 2012/0125449 | A1 | 5/2012 | Muzzo et al. | |
| 2018/0361034 | A1* | 12/2018 | Tobien | F16K 31/5245 |
| 2021/0190231 | A1* | 6/2021 | Bian | F16K 31/52408 |

FOREIGN PATENT DOCUMENTS

| | | | |
|---|---|---|---|
| DE | 2931501 | A1 | 2/1981 |
| DE | 3336386 | A1 | 4/1985 |
| EP | 0424782 | A1 | 5/1991 |
| EP | 1243823 | A1 | 9/2002 |
| EP | 1953429 | A1 | 8/2008 |
| EP | 2663793 | A1 | 11/2013 |
| FR | 790667 | A * | 5/1935 |
| FR | 2802281 | A1 | 12/1999 |
| GB | 1319830 | A * | 7/1970 |
| WO | 2007048954 | A1 | 5/2007 |
| WO | 2014187835 | A2 | 11/2014 |
| WO | 2017114663 | A1 | 7/2017 |
| WO | 2018113941 | A1 | 6/2018 |
| WO | 2018215159 | A1 | 11/2018 |

* cited by examiner

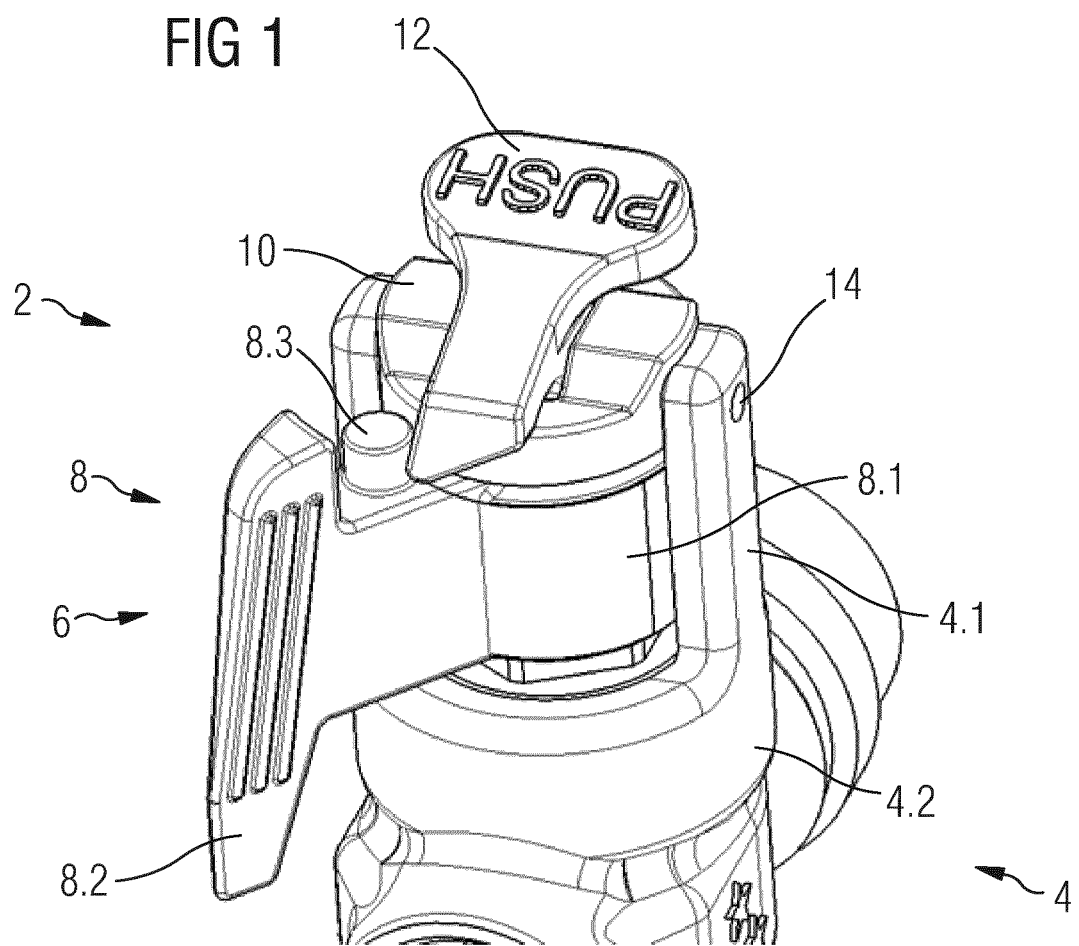

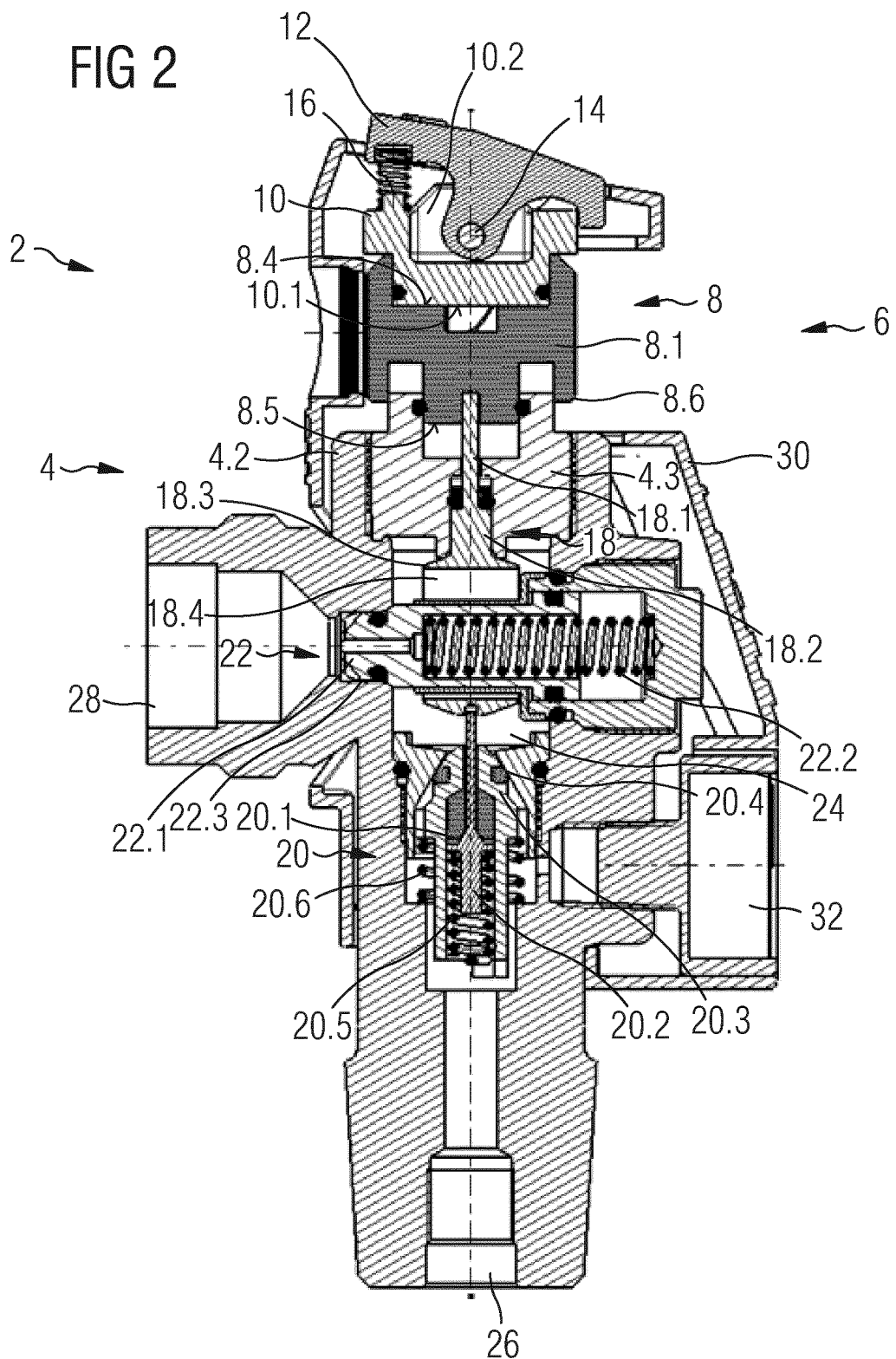

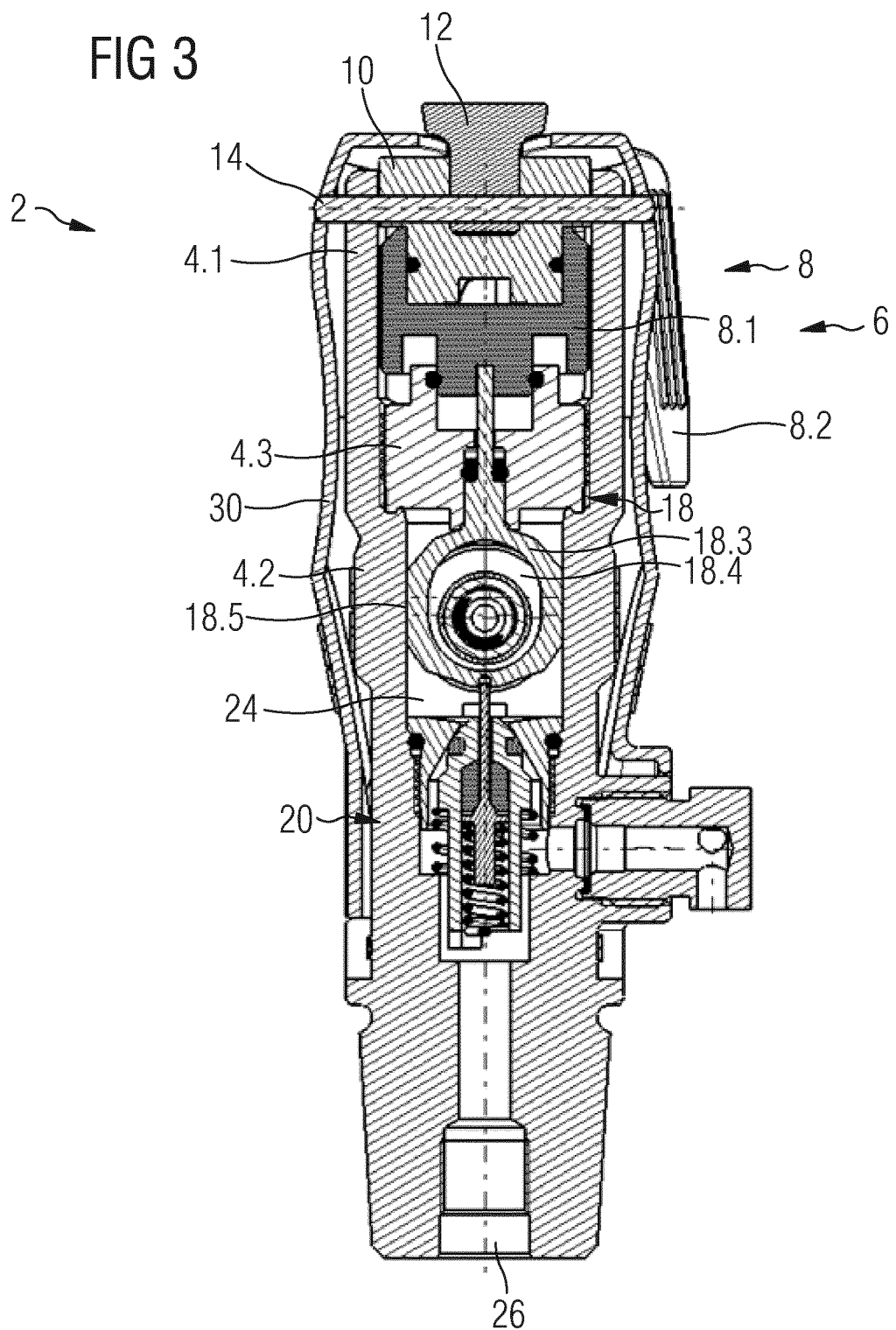

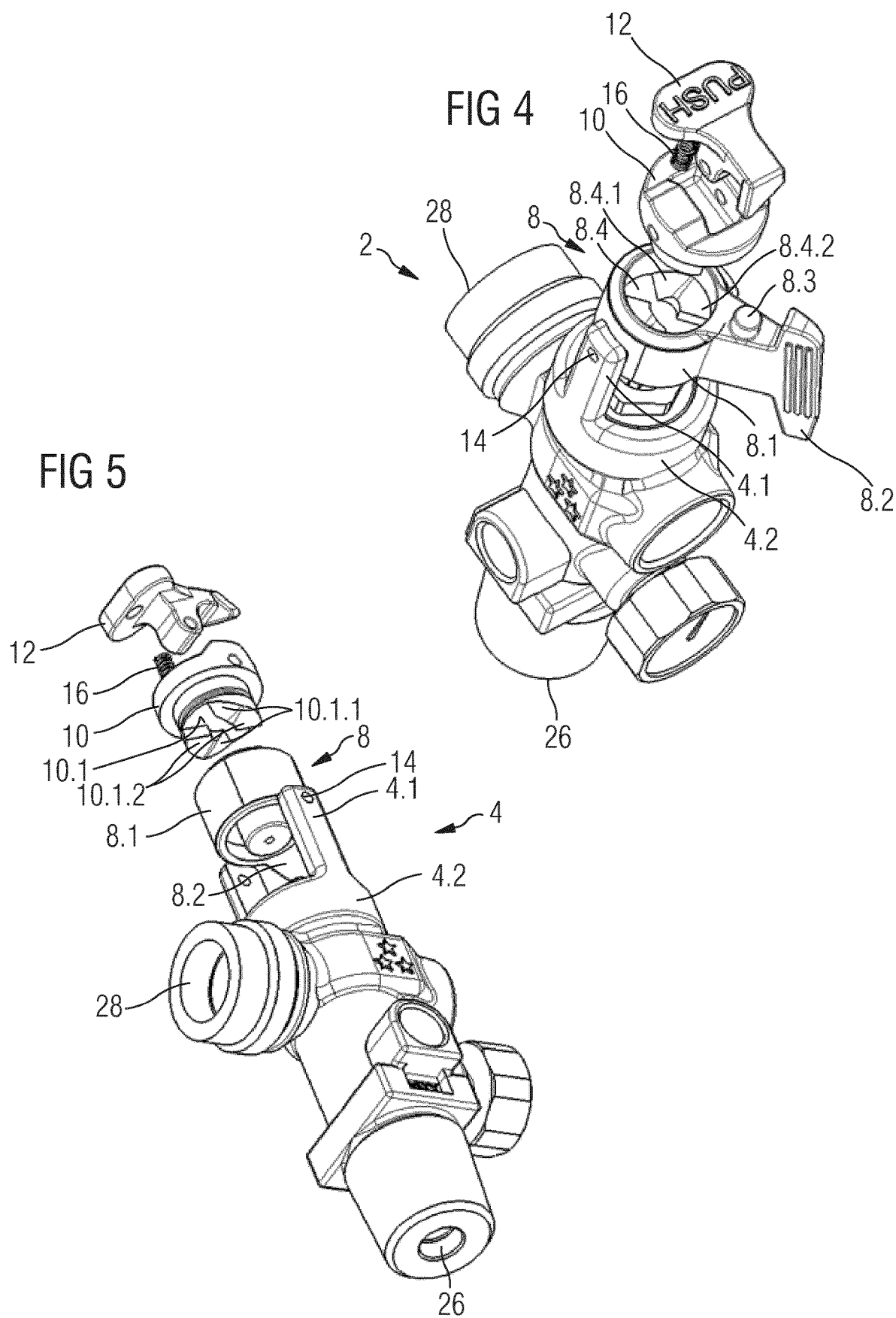

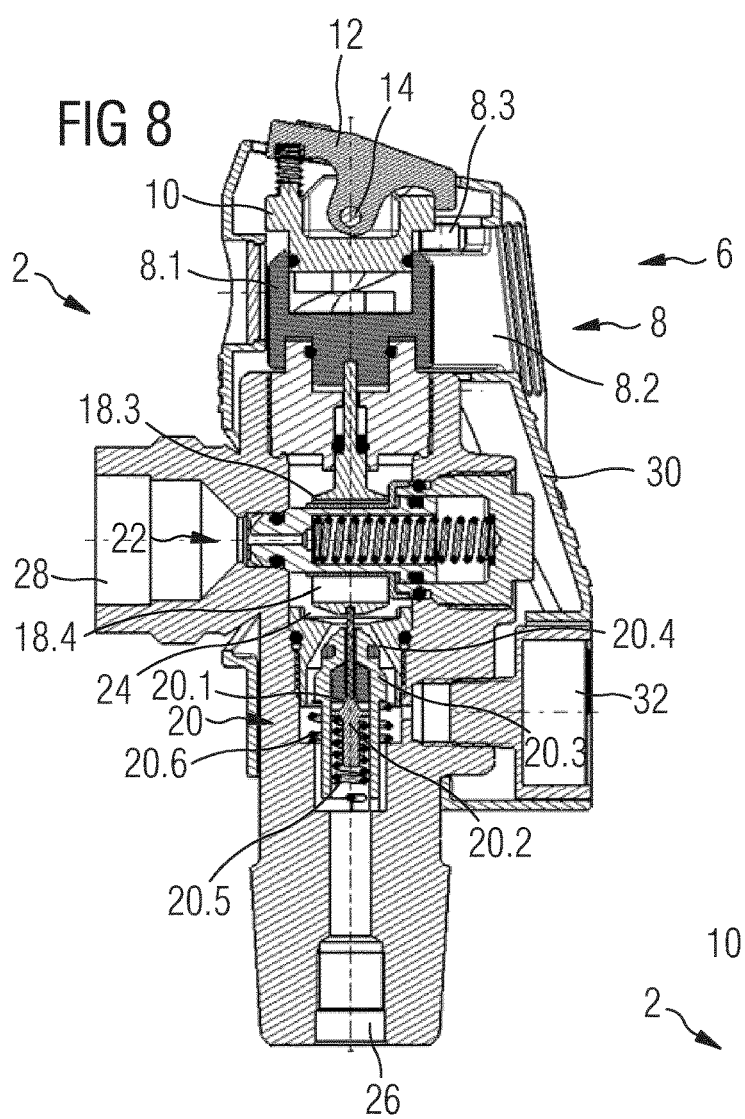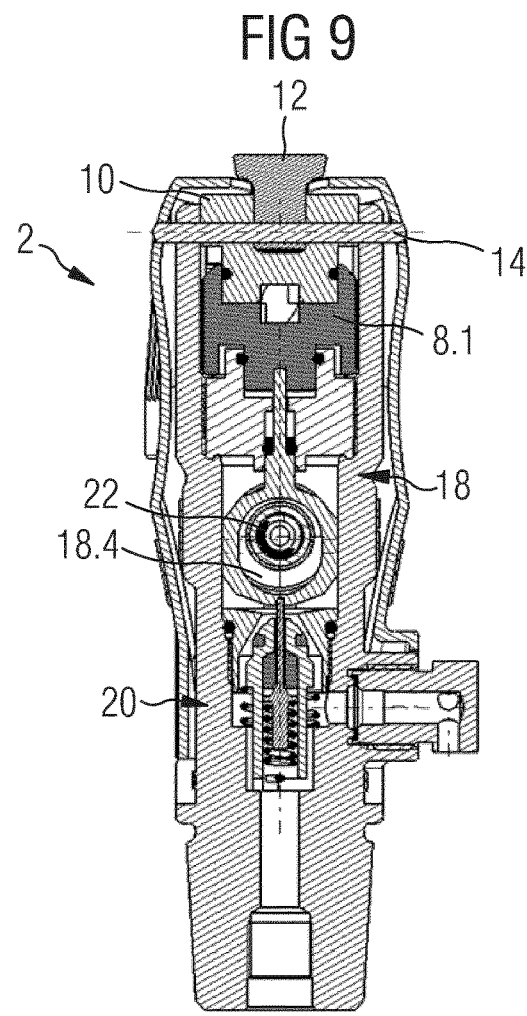

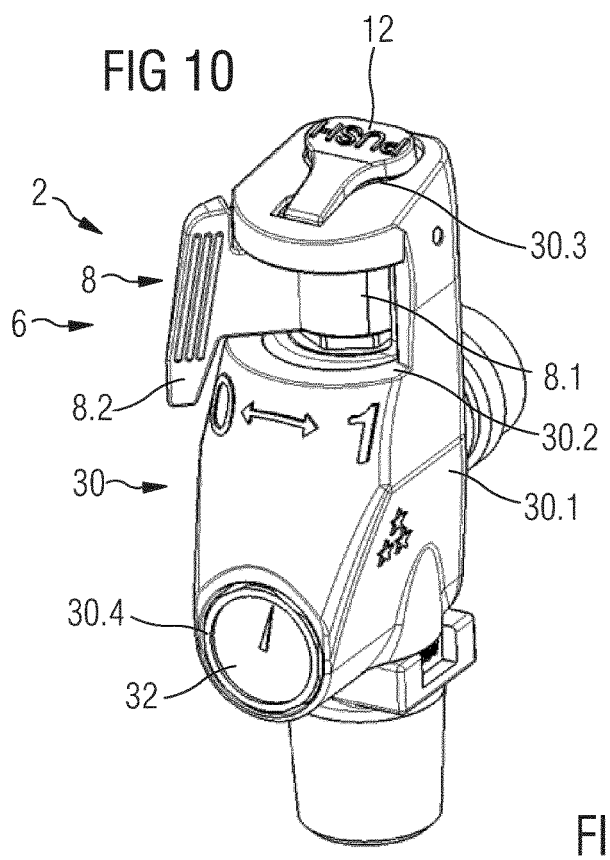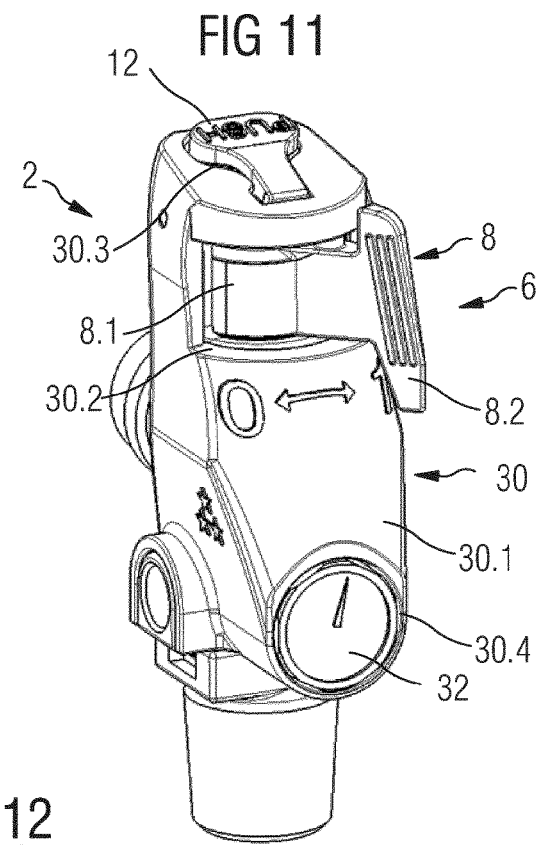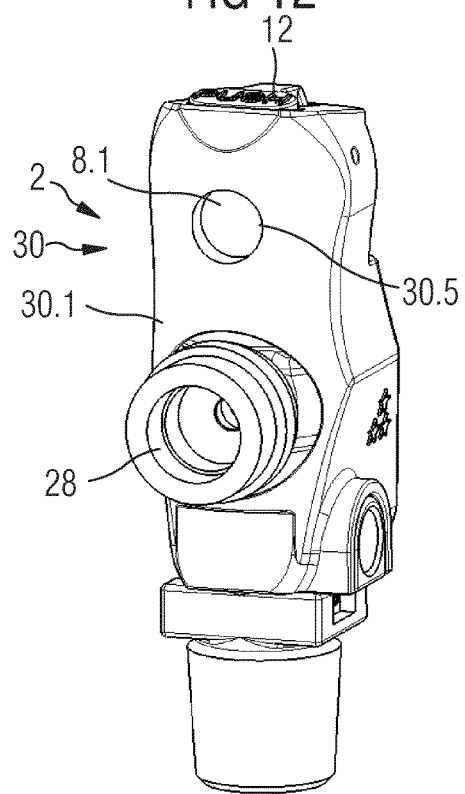

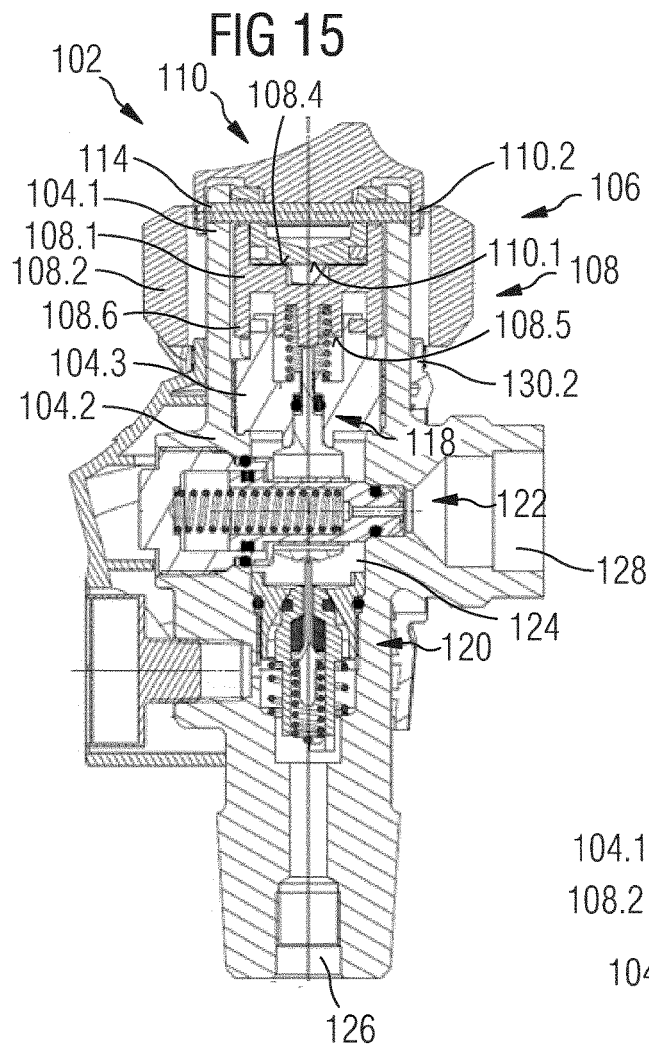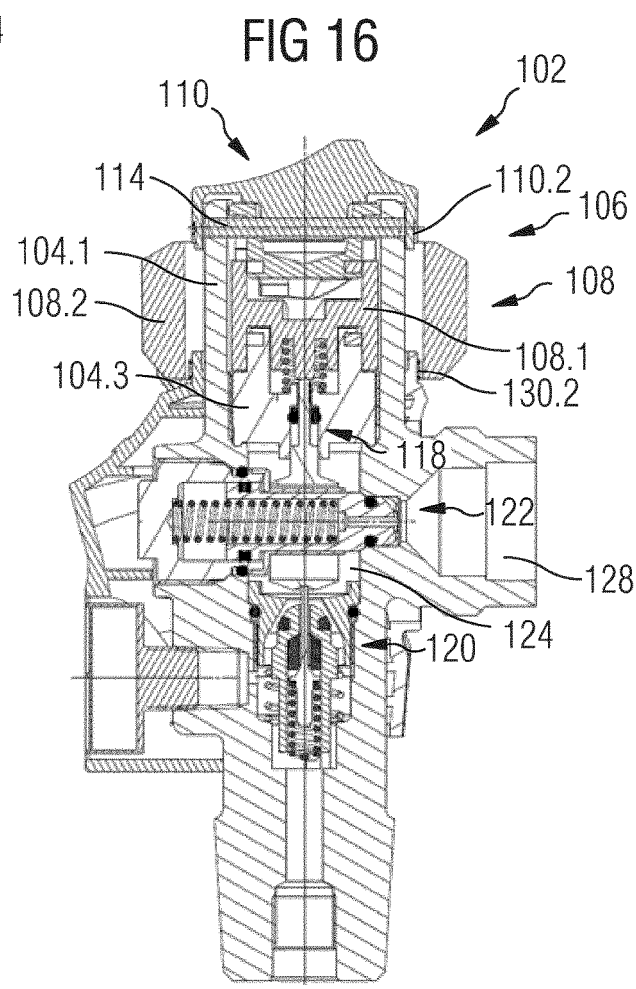

GAS CYLINDER VALVE WITH RADIALLY EXTENDING OPERATING HANDLE

The present invention is the US national stage under 35 U.S.C. § 371 of International Application No. PCT/EP2020/072859 which was filed on Aug. 14, 2020, and which claims the priority of application LU 101358 filed on Aug. 20, 2019 and LU 101513 filed on Dec. 3, 2019, the content of which (text, drawings and claims) are incorporated here by reference in its entirety.

FIELD

The invention is directed to the field of valves, more particularly valves for compressed gas, even more particularly to gas cylinder valves. The invention is also directed to the hand operating device of such valves.

BACKGROUND

Classical gas cylinder valves comprise a body with a threaded inlet to be screwed on the neck of the gas cylinder, a shut-off device housed in the body and a hand-wheel at the top of the body and configured for operating the shut-off device. Several turns are usually necessary for operating the shut-off device, i.e., from a closed position to a totally opened position and vice versa. The rotation of the hand-wheel for opening the gas passage in the valve naturally achieves a progressive opening, which is desirable for most applications.

It is also known, e.g., from U.S. Pat. No. 3,035,605A, to replace the above described hand-wheel by a lever pivotally mounted at the top of the valve body. The lever comprises a cam profile around the pivoting axis, acting on an actuating member longitudinally movable in translation inside the body and configured for actuating the shut-off device. The valve is operated by moving the lever from a closed position along the body to an opening position raised relative to the body. This type of hand operating device is advantageous in that it is easier to operate and naturally indicates the opening/closed status of the valve. It has however for major drawback that it is bulky and that the opening of the passage can occur very rapidly when the lever is moved by an operator not taking a special care about the movement pace.

Various solutions exist for achieving a slow-opening of a gas valve, including using a shut-off device comprising a pilot valve mounted on a main valve, configured such that opening of the pilot valve causes a counter-pressure on a downstream side to progressively build up so as to open the main valve.

Prior art patent document published DE 33 36 386 A1 discloses a compact hand operating device for a valve with a shut-off device, commanding in translation an actuating member of the shut-off device. The hand operating device comprises a bell-shaped support element and a rotating element with two contact surfaces configured for sliding along corresponding ramps on the support element so as to convert rotation of the rotating element into a translation of the actuating member. The rotating element is rotatably coupled to an outer cylindrical handle supported by the support element. This hand operating device with ramps is interesting in that it allows commanding the shut-off device by a rotation of less turns than with a classical thread conversion mechanism, more particularly to vary the ration of conversion of rotating into translation along the angular stroke in order to provide quick opening and closing of the valve, i.e., with a reduced angular rotation, and a more progressive central adjusting angular area. However, this hand operating device is primarily designed for finely adjusting valves of heating elements. Its construction is not particularly adapted for compressed gas valves, in particular with regard to its mounting on such valves and also with regard to its robustness.

SUMMARY

The invention has for technical problem to overcome at least one drawback of the above cited prior art. More particularly, the invention has for technical problem to provide a compact and robust hand operating device for a lift valve.

The invention is directed to a valve comprising a body with an inlet, an outlet and a passage fluidly interconnecting the inlet and outlet; a shut-off device of the passage, with an actuating member movable along a longitudinal axis; a hand operating device of the actuating member, for selectively opening or closing the passage, and comprising a support element and a rotating element with at least one contact surface configured for sliding along at least one ramped surface on the support element, or vice versa, so as to convert rotation of the rotating element into a translation of the actuating member; wherein the rotating element comprises a radially extending handle.

The invention can also be directed to a valve comprising a body with an inlet, an outlet and a passage fluidly interconnecting the inlet and outlet; a shut-off device of the passage, with an actuating member movable along a longitudinal axis; a hand operating device of the actuating member, for selectively opening or closing the passage, and comprising a support element and a rotating element with at least one contact surface configured for sliding along at least one ramped surface on the support element, or vice versa, so as to convert rotation of the rotating element into a translation of the actuating member.

Advantageously a resilient longitudinal force presses the rotating element against the support element.

According to various embodiments, the hand operating device further comprises a securing hook mounted on the support element and configured for engaging with the radially extending handle in the closed position of the passage.

According to various embodiments, the support element is generally disk-shaped with an inner face provided with the at least one contact or ramped surface and an outer face in vis-à-vis of the securing hook.

According to various embodiments, the support element is attached to the body by a pin extending transversally through the support element and body.

According to various embodiments, the body comprises two arms extending longitudinally and diametrically opposed relative to the longitudinal axis, with distal ends with holes through which the pin extends transversally.

According to various embodiments, the securing hook is pivotally mounted on the pin.

According to various embodiments, the rotating element comprises a central portion with a recessed upper face provided with the at least one contact or ramped surface and engaging in a rotatable manner with the support element.

According to various embodiments, the central portion of the rotating element comprises an outer peripheral surface with a first area adjacent on one side to the radially extending handle and a second area adjacent on the other side to the radially extending handle, the first and second areas showing different colours and/or indicia so as to provide a visual indication of a closed/open state of the valve.

According to various embodiments, the rotating element comprises a lower face engaging in a rotatable manner with an upper portion of the body.

According to various embodiments, the lower face of the rotating element comprises a protruding portion engaging in a slidable manner with a bore formed in the upper portion of the body.

According to various embodiments, the actuating member extends through the bore in the upper portion of the body.

According to various embodiments, the lower face of the rotating element comprises a sleeve surrounding the upper portion of the body.

According to various embodiments, the upper portion of the body is formed by a circular element with an outer thread engaging with an inner thread in a main element of the body and with an outer non-circular surface such as to be able to engage in rotation with a tool for tightening the outer thread with the inner thread, the outer non-circular surface engaging in a slidable manner with the sleeve of the rotating element.

According to various embodiments, the shut-off device of the passage comprises a seat in the passage and a closing element configured for cooperating with the seat on an upstream side of the seat, the actuating member being configured for moving the closing element away from the seat for opening the passage.

According to various embodiments, the seat is a pilot seat formed on a main closing element configured for cooperating with a main seat in the passage and formed on the body, the closing element being a pilot closing element with a stem extending through the main closing element to a downstream side of the main closing element.

According to various embodiments, the actuating member extends through a longitudinal cavity in the body and comprises a central portion with a transversal opening crossed by a piston biased by a spring against an outlet seat in the body, downstream of the shut-off device, the piston and outlet seat being configured for forming a residual pressure device.

According to various embodiments, the contact and/or ramped surfaces on the rotating element and the support element are configured such as to provide to the rotating element a closed self-locking end position and an open self-locking end position.

According to various embodiments, the rotating element, when in an angular position between the closed self-locking end position and the open self-locking end position, is urged to one of the two end positions, in various instances the closed self-locking end position. This movement is caused by a resilient longitudinal force pressing the rotating element against the support element.

According to various embodiments, the ramped surfaces on the rotating element and/or the support element show an inclination that is greater than a self-locking inclination by friction.

According to various embodiments, the open self-locking end position and/or the closed self-locking end position extends over an angular sector of at least 20°, in various instances at least 30°.

According to various embodiments, the valve further comprises a protective cover with a wall enveloping and matching an outer surface of the valve body, the wall showing a first opening through which the radially extending handle extends and dimensioned for allowing the first and second areas to be selectively visible in the open and closed positions.

According to various embodiments, the wall of the protective cover shows a second opening opposed to the first opening, the outer peripheral surface of the central portion of the rotating element comprising two adjacent areas showing different colours and/or indicia so as to be selectively visible through the second opening in the open and closed positions.

The invention is particularly interesting in that it provides a compact and robust hand operating device on a valve. That fact the grip area of the hand operating device is formed by the radially extending handle means that the upper and central area of the hand operating device can provide a stable and robust bearing of the rotating element. It also provides a useful area for placing a securing hook. Operation of the hand operating device is particularly convenient and secure in that both end positions in the closed and open states of the valve, respectively, are stable, i.e., self-locking whereas any intermediate position is not self-locking, the rotating element is automatically urged back to one the two stable end positions, in various instances the closed end position. This automatic movement is the result of properly inclined ramps surfaces along contact surfaces under a compressive force of the rotating element against the support element, exerted by a spring, for instance a spring of the shut-off device. The central portion of the rotating element is also very useful in that its peripheral outer surface provides at least one visual indication of the open/closed state of the valve.

DRAWINGS

FIG. 1 is a perspective view of a top part of a valve according to a first exemplary embodiment of the invention, in a closed position.

FIG. 2 is a longitudinal sectional view of the valve of FIG. 1 turned about 90°, in the closed position, in accordance with various instances of the invention.

FIG. 3 is another longitudinal sectional view of the valve of FIG. 1, in the closed position, in accordance with various instances of the invention.

FIG. 4 is a first exploded perspective view of the valve of FIGS. 1 to 3, in accordance with various instances of the invention.

FIG. 5 is a second exploded perspective view of the valve of FIGS. 1 to 4, in accordance with various instances of the invention.

FIG. 8 is a longitudinal sectional view of the valve of FIGS. 1 to 7, in the open position as illustrated in FIG. 7, in accordance with various instances of the invention.

FIG. 9 is another longitudinal sectional view of the valve of FIGS. 1 to 8, in the open position as illustrated in FIG. 7, in accordance with various instances of the invention.

FIG. 10 is perspective view of the valve of FIGS. 1 to 9 with a protective cover, in the closed position, in accordance with various instances of the invention.

FIG. 11 is another perspective view of the valve of FIGS. 1 to 9 with a protective cover, in the open position, in accordance with various instances of the invention.

FIG. 12 is a perspective view of the outlet face of the valve of FIGS. 1 to 11, in accordance with various instances of the invention.

FIG. 15 is a longitudinal sectional view of the valve of FIG. 13 turned about 90°, in the closed position, in accordance with various instances of the invention.

FIG. 16 is a longitudinal sectional view of the valve of FIG. 14 turned about 90°, in the open position, in accordance with various instances of the invention.

DETAILED DESCRIPTION

Figure 6:
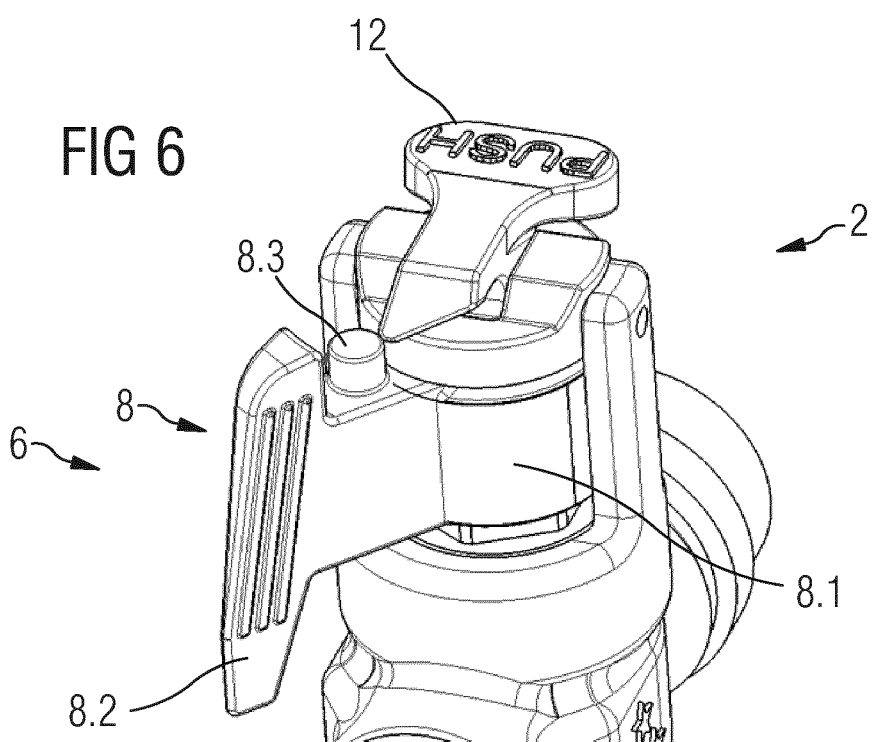
FIG. 6 is a perspective view of a top part of the valve of FIGS. 1 to 5, in a position where the radially extending handle is freed from its closed position, in accordance with various instances of the invention.

FIGS. 1 to 12 exemplarily illustrate a valve, for instance for compressed gas, according to a first exemplary embodiment of the invention.

FIG. 1 is a perspective view of the valve according to the first exemplary embodiment of the invention.

The valve 2 comprises a body 4 that extends along a longitudinal axis. It comprises a non-visible lower portion with a threaded end for engaging in a neck of a gas cylinder or tank. It comprises an upper portion well visible and to which a hand operating device 6 is mounted. The latter comprises a rotating element 8 with a central element 8.1 that is generally cylindrical, and a handle 8.2 that extends radially from the central element 8.1. The rotating element 8 is aligned with the longitudinal axis of the valve and is pivotally mounted so as to rotate around the axis. The hand operating device 6 comprises also a support element 10 located above the rotating element 8 and against which the rotating element 8 abuts. The support element 10 is attached to the body 2, for instance via a pin 14 that extends transversally through two arms 4.1 of the main element 4.2 of the body 4, extending longitudinally and diametrically opposed relative to the longitudinal axis. The faces of the rotating element 8 and of the support element 10 that are in vis-à-vis and contact each other are not visible in FIG. 1. They show ramped contact surfaces (not visible) that are configured such that a rotation of the rotating element 8 generates a translational movement thereof relative to the support element 10. This translational movement moves an actuating member of a shut-off device housed in the body 4 of the valve 2.

Still with reference to FIG. 1, the hand operating device 6 comprises also a securing hook 12 that is located on an upper or distal side of the support element 10 and configured for engaging with the rotating element 8, more specifically with the radially extending handle 8.2 thereof.

In the configuration exemplarily illustrated in FIG. 1, the valve is in a closed position, meaning that the rotating element 8 is rotated clockwise until the bossing 8.3 on the radially extending handle 8.2 contacts the distal end of the securing hook 12, so as to pivot the hook 12 until it pivots back so as to prevent rotation of the rotating element 8 in the opening direction. In that position the actuating member (not visible) of the shut-off device is not actuated. In the open position, the radially extending handle is rotated by about 70° anticlockwise. For opening the valve, the securing hook 12 needs to be deactivated by pressing the area marked "PUSH" for lifting the distal end and disengage the hook from the bossing 8.3 and thereby from the rotating element 8.

The securing hook is advantageously pivotally mounted on the body via the pin 14 extending transversally through the two arms 4.1 of the body 4 and through the support element 10.

FIGS. 2 and 3 are two longitudinal sectional views of the valve of FIG. 1.

In FIG. 2 the section plane is perpendicular to the pin 14 whereas in FIG. 3 the section plane comprises the axis of the pin.

In FIG. 2 we can observe that the upper face 8.4 of the rotating element 8 is recessed and receives the protruding lower face 10.1 of the support element 10. More specifically, the upper face 8.4 of the rotating element 8 forms a bore that receives a cylindrical portion of the lower face 10.1 of the support element 10. A gasket can be provided between the bore and cylindrical portion for preventing dust and dirt entry on the ramps.

The upper face 10.2 of the support element is recessed for receiving a pivot portion of the securing hook 12. The latter is urged in an engaging position with the bossing 8.3 (FIG. 1) by a spring 16. The latter is advantageously a compression spring placed at an opposite side, relative to the pivoting axis formed by the pin 14, of the distal end cooperating with the bossing 8.3.

The lower face 8.5 of the rotating element 8 is protruding and engages in a recessed upper portion of the body 4. For instance, that upper portion is formed by a circular element 4.3 with an outer thread engaging with an inner thread in a main element 4.2 of the body. The recess in the circular element 4.3 forms a bore into which an actuating member 18 of a shut-off valve 20 extends. Similarly, to the engagement between the support element 10 and the rotating element 8, a gasket can be provided between the engagement of the rotating element 8 with the upper portion of the body 4 formed by the circular element 4.3. For instance, the gasket is located in a groove formed in the bore of the circular element 4.3.

As this is apparent in FIG. 2, the rotating element 8 can comprise on its lower face 8.5 an outer sleeve 8.6 that surrounds an outer surface of the circular element 4.3. This outer surface can be non-circular surface such as to be able to engage in rotation with a tool for tightening the outer thread with the inner thread.

The actuating member 18 can comprise an upper portion extending through the bore in the circular element 4.3, an intermediate portion 18.2 that engages with the circular element 4.3 in a slidable and gas tight fashion, and a lower portion 18.3 with an opening 18.4 that is crossed transversally by a residual pressure device 22.

The main element 4.2 of the body 4 forms a passage 24 for the gas, fluidly interconnecting a gas inlet 26 with a gas outlet 28. The shut-off device 20 is configured for selectively opening and closing the passage 24. The residual pressure device 22 is located downstream of the shut-off device 20. It comprises essentially a piston 22.1 that is urged by a spring 22.2 against an outlet seat 22.3 that is for instance aligned with the outlet 28. The piston 22.1 and spring 22.2 are dimensioned such that it opens the passage 24 towards the outlet 28 only when the pressure upstream of the outlet seat 22.3 and piston 22.1 is greater than a residual pressure value, e.g., of a few bar like 5 bar.

The shut-off device 20 comprises a pilot seat 20.1 and a pilot closing element 20.2 cooperating with the pilot seat 20.1 for selectively opening and closing the passage through the seat. The pilot seat 20.1 is formed on a main closing element 20.3 that cooperates with a main seat 20.4 formed on the body 4. A first compression spring 20.5 is operatively placed between the pilot closing element 20.2 and the main closing element 20.3 so as to urge the pilot closing element 20.2 against the pilot seat 20.1 and thereby close the passage through the pilot seat. A second compression spring 20.6 is operatively provided between the main closing element 20.3 and the body 4. As this is apparent, the pilot closing element 20.2 comprises a stem extending through a passage in the main closing element 20.3 until a downstream side of the main closing element.

In the configuration of FIG. 2 (as in FIG. 1), the valve 2 is a closed position.

The pilot closing element 20.2 is urged by the first compression spring 20.5 against the pilot seat 20.1, and the main closing element 20.3 is urged against the main seat 20.4 by the second compression spring 20.6. Also, the gas pressure at the inlet 26 urges both pilot and main closing elements 20.2 and 20.3 against their respective seats 20.1 and 20.4. These forces on the pilot closing element 20.2 urges the actuating member 18 in an upper position allowed by the angular position of the rotating element 8.

For opening the shut-off valve 2, an operator needs to operate the radially extending handle 8.2 by rotating the rotating element 8, for instance anticlockwise, leading to a lowering movement of the rotating element 8 by virtue of the contact surfaces and ramps, and of the actuating member 18 opening the gas passage through the pilot seat 20.1 on the main closing element 20.3. A limited flow of gas takes place, so that a counter-pressure on a downstream side of the main closing element 20.3 progressively builds up. The first compression spring 20.5, in a compressed state, exerts a force on the main closing element 20.3 that is larger than then the opposed force of the second compression spring 20.6. Once the counter-pressure reaches a certain level, the resulting force by the gas pressure on the main closing element 20.3 does not compensate the difference between the force of the first compression spring 20.5 and the force of the second compression spring 20.6. The main closing element 20.3 starts then to move away from the main seat 20.4 so as to fully open the passage.

As this is apparent, the transversal opening 18.4 in the lower portion 18.3 of the actuating member 18 is designed so as to allow translational movement of the actuating member, e.g., is oblong.

As this is apparent, a protective cover 30 can be provided on the valve 2, in various instances made of plastic material.

Also, a manometer 32 can be provided, in fluid connection with the inlet 26 so as to indicate the pressure inside the gas cylinder.

In FIG. 3, we can better see the transversal opening 18.4 in the lower portion 18.3 of the actuating member 18. Also, the lower portion 18.3 shows two parallel longitudinal side faces 18.5 that slide along a bore formed in the main element 4.2 of the body 4. The side faces are portions of a cylindrical surface that essentially corresponds to the related bore.

FIGS. 4 and 5 are two perspective exploded views of the hand operating device 6 of the valve 2 of FIGS. 1 to 3.

In FIG. 4 we can observe that the recessed upper face 8.4 of the rotating element 8 comprises two diametrically ramped contact surfaces. More specifically each ramped contact surface comprises an inclined ramped portion 8.4.1 followed by a flat horizontal (relative to a plane perpendicular to the longitudinal axis) portion 8.4.2.

Similarly, FIG. 5 shows that the protruding lower face 10.1 of the support element 10 comprises two diametrically ramped contact surfaces where each ramped contact surface comprises an inclined ramped portion 10.1.1 followed by a flat horizontal (relative to a plane perpendicular to the longitudinal axis) portion 10.1.2.

When the hand operating device 6 is assembled, the protruding lower face 10.1 of the support element 10 engages in the recessed upper face 8.4 of the rotating element 8. The rotating element 8 can show essentially two stable positions along the longitudinal axis, namely a first and higher position as illustrated in FIGS. 2 and 3, where the flat horizontal portions 8.4.2 of the ramped contact surfaces of the rotating element 8 rests on the bottom of the protruding lower face 10.1 of the support element 10 and, similarly, the flat horizontal portions 10.1.2 of the ramped contact surfaces of the support element 10 rest on the bottom of the recessed upper face 8.4 of the rotating element 8, and a second lower position where the inclined ramped portions 8.4.1 and 10.1.1 of the ramped contact surfaces on the rotating element 8 and the support element 10, respectively, contact each other, thereby providing a self-locking and stable open position.

The ramped contact surfaces on the rotating element 8 and the support element, as described here above, are advantageously designed such that the rotating element 8 has no stable position between the open and closed end positions. To that end, the inclined ramped portions 8.4.1 and 10.1.1 show inclinations that are higher than a limit self-locking angle. The self-locking angle is a maximum angle from which the frictional forces become high enough and the horizontal force component resulting of the compression of the contact surfaces become low enough for preventing rotation. Determination of the self-locking angle is common in worm gears and trapezoidal spindle in drives mechanism.

Figure 7:
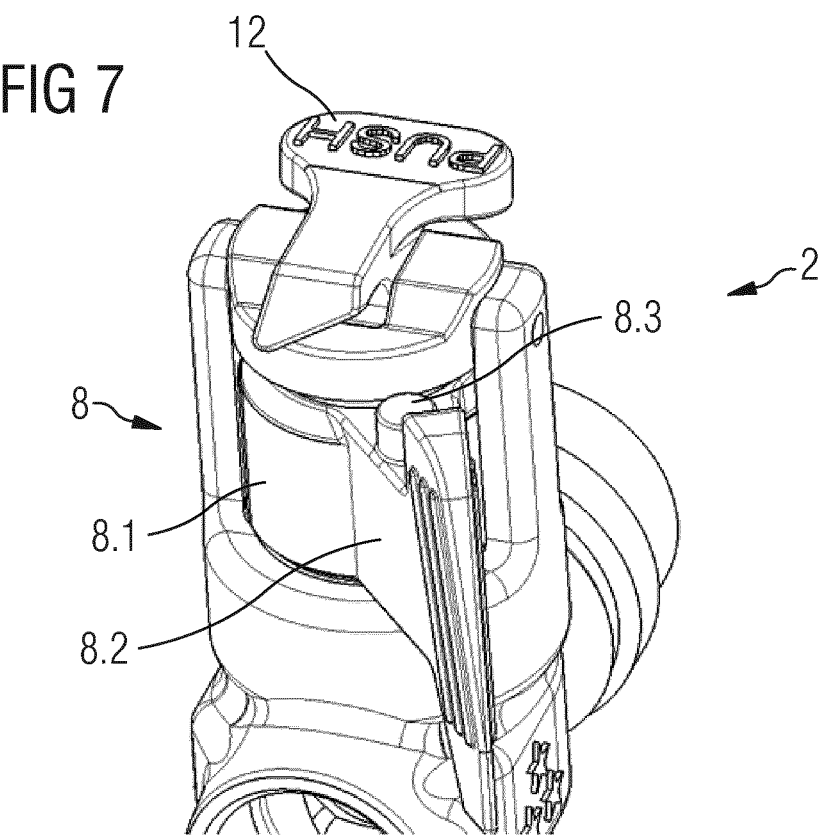
FIG. 7 is a perspective view of a top part of the valve of FIGS. 1 to 6, in a position where the radially extending handle is moved to the open position, in accordance with various instances of the invention.

FIGS. 6 and 7 are perspective views of the hand operating devices 6 of the valve of FIGS. 1 to 5, where in FIG. 6, the securing hook 12 is actuated so as to free the engagement with the bossing 8.3 on the rotating element 8, allowing rotation thereof, for instance in the anticlockwise rotation, for opening the valve 2. In FIG. 7, the rotating element 8 is rotated towards an end position where the valve is open.

FIGS. 8 and 9 correspond to FIGS. 2 and 3 where the valve 2 is in the open position, for instance when the hand operating device 6 is as illustrated in FIG. 7. We can observe that the rotating element 8 is in the lower position and that the actuating member 18 is lowered as to move the pilot closing element 20.2 away from the pilot seat 20.1. As already explained above, in that situation, the gas under pressure at the inlet 26 flows through the passage formed in the main closing element 20.3 and allows a counter pressure to build up on a downstream side of the shut-off device 20. That counter pressure reduces the resulting force exerted on the main closing element 20.3 by the gas and allows the first compressing spring 20.5 to move the main closing element 20.3 away from the main seat 20.4.

Still in FIGS. 8 and 9, we can observe that the transversal opening 18.4 formed in the lower portion 18.3 of the actuating member 18 is designed for allow a free translational movement of the actuating member 18 between the closed and open positions without interfering with the residual pressure device 22.

FIGS. 10 and 11 are perspective views of the valve of FIGS. 1 to 9, provided with the protective cover 30 illustrated in FIGS. 2, 3, 8 and 9. We can observe that this cover 30 comprises essentially a wall 30.1 with a complex shape that matches the outer shape of the valve 2, with an opening 30.2 for the radially extending handle 8.2, an opening 30.3 for the securing hook 12, an opening 30.4 for the manometer 32.

Important is to note that the central element 8.1 of the rotating element 8 provides surfaces that can indicate the opening/closing state of the valve. In FIG. 10, the outer surface of the central element 8.1, directly at the right of the radially extending handle 8.2 is visible whereas in FIG. 11, the outer surface of the central element 8.1, directly at the left of the radially extending handle 8.2 is visible.

FIG. 12 is a perspective view of a face of the valve of FIGS. 1 to 11 that is opposed to the radially extending handle. As this is apparent, the wall 30.1 of the protective cover 30 covers also that opposed face of the valve 2 and comprises an opening forming a window 30.5 that is in vis-à-vis of the central portion 8.1 of the rotating element 8. This provides also a visual indication of the opening/closing state of the valve. The angular stroke of the rotating element 8 is large enough so that the outer surface of the central portion 8.1 of the rotating element 8 moves circumferentially over at least the width of the window 30.5 between the closed and open end positions. That outer surface can be provided with two adjacent areas of different colours and/or with different indicia (like on/off or O/1) positioned such as to be selectively visible in the two end positions. This visual indication is particularly interesting in that it is on the face or side of the valve 2 that comprises the outlet 28. It can be complementary to the visual indication provided on the other face illustrated in FIGS. 10 and 11.

FIGS. 13 to 18 illustrate a valve, for instance for compressed gas, according to a second exemplary embodiment of the invention. The reference numbers of the first exemplary embodiment in FIGS. 1 to 12 are used here for designating the same or corresponding elements, these numbers being however incremented by 100. It is also referred to the description of these elements in relation with the first exemplary embodiment.

Figure 13:
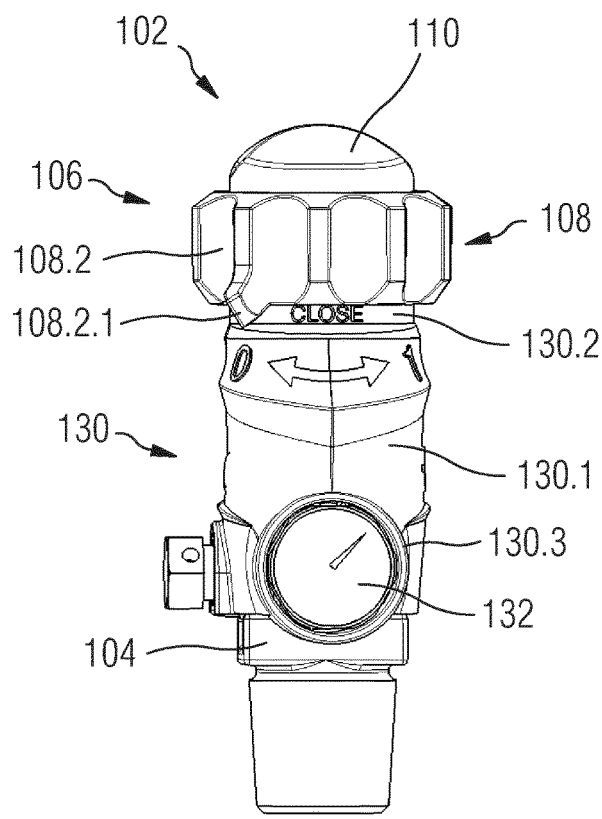
FIG. 13 is perspective view of a valve according to a second exemplary embodiment of the invention, in the closed position, in accordance with various instances of the invention.
Figure 14:
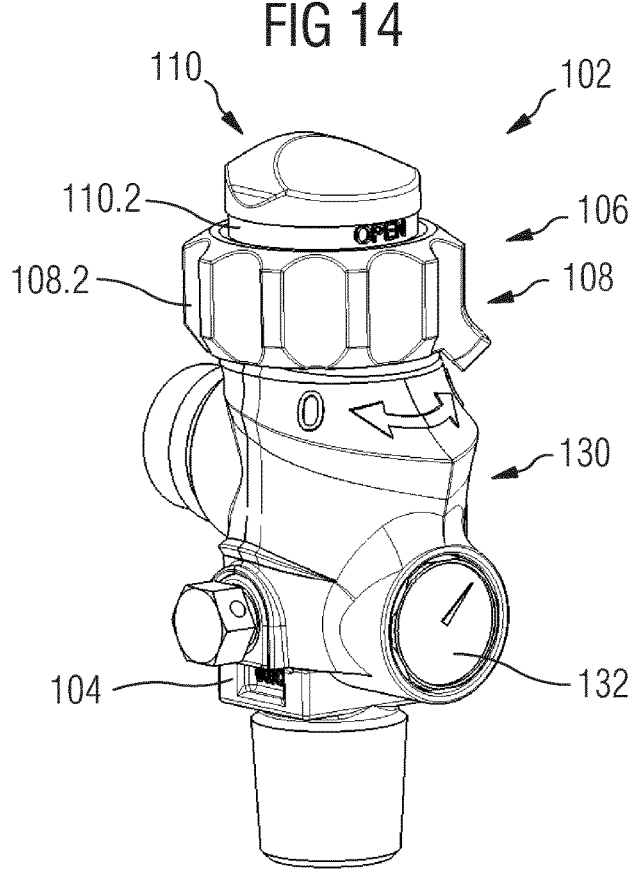
FIG. 14 is another perspective view of the valve of FIG. 13, however in the open position, in accordance with various instances of the invention.

FIGS. 13 and 14 are two views of the same valve 102 in the closed state (FIG. 13) and in the opened state (FIG. 14).

The valve 102 according to this second exemplary embodiment differs from the valve of the first exemplary embodiment essentially in the design of the hand operating device 106, more specifically in the design of the rotating element 108 and, as a consequence, of the support element 110 and the housing 130. The rotating element 108 comprises an outer gripping ring 108.2 that is accessible from any angular position. Similarly to the radially extending handle of the first exemplary embodiment, the rotating element 108 shows, on the outer gripping ring 108.2, a protruding portion 108.2.1 serving as indicator of the open or closed states with reference to indicia, for instance "0" and "1", provided on the outer surface of the valve, for instance on the housing 130.

Also, the support element 110 can show at a lower portion thereof an annular outer surface 110.2 that is configured to fit inside an upper portion of the outer gripping ring 108.2 when the latter is in an upper position. Similarly, the housing 130 can show an upper annular portion 130.2 that similarly to the annular outer surface 110.2 of the support element 110, is configured to fit inside the outer gripping ring 108.2, i.e., in a lower portion of the outer gripping ring 108.2 when the latter is in a lower position.

Upon rotation of the rotating element 108 via the outer gripping ring 108.2, over an angular sector of less than 180°, the rotating element 108 will move in translation along the longitudinal axis of the valve 102 for selectively opening or closing the shut-off device of the valve, and thereby selectively cover and uncover at least one of the annular outer surface 110.2 and the annular portion 130.2, showing a colour and/or indicia, so as to provide a visual indication of a closed/open state of the valve.

FIGS. 15 and 16 are two longitudinal sectional views of the valve of FIGS. 13 and 14, turned about 90°, in the closed and open positions, respectively.

As this is apparent, the rotating element 108 comprises a central portion 108.1 that is very similar or identical to the central portion of the first exemplary embodiment. That central portion 108.1 is connected to the central portion 108.2 by two radially extending connectors that are not visible here (but well in FIGS. 17 and 18).

As this is also apparent, the pin 114 attaching the support element 110 to the body, i.e., to the two arms 104.1 extending longitudinally and diametrically opposed relative to the longitudinal axis, extends through holes formed in a lower annular portion of the support element 110, forming the annular outer surface 110.2. The latter is uncovered when the rotating element 108 is in a lower position, for instance corresponding to an open state of the shut-off device 120. When assembling the valve 102, the pin can then be radially inserted when the rotating element 108 is position in its lower position. A label or any equivalent covering means can be placed on these holes for hiding them and also the pin 114.

It is referred to the description of FIGS. 2 and 8 relating to the first exemplary embodiment, for the same or corresponding elements.

Figure 17:
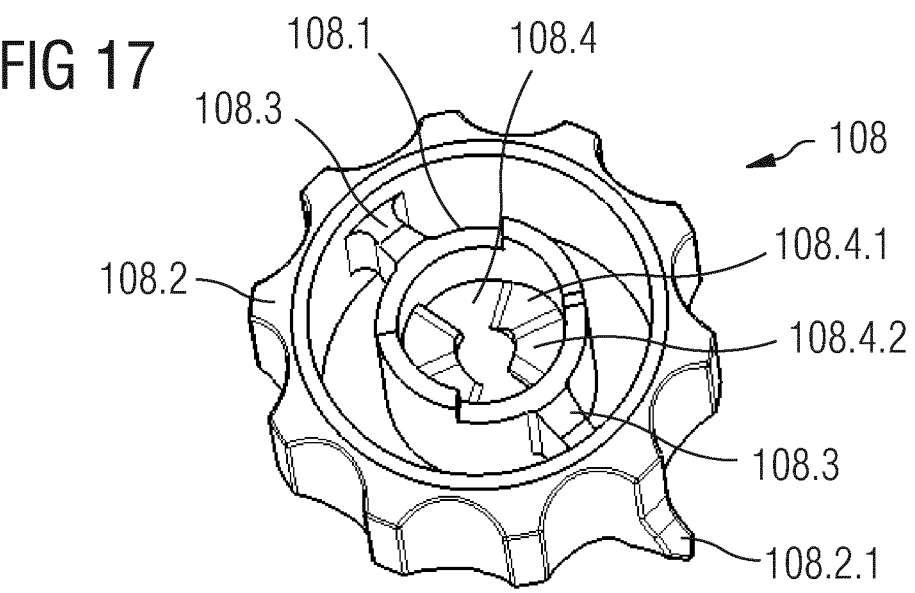
FIG. 17 is a top perspective view of the rotating element of the valve of FIGS. 13 to 16, in accordance with various instances of the invention.
Figure 18:
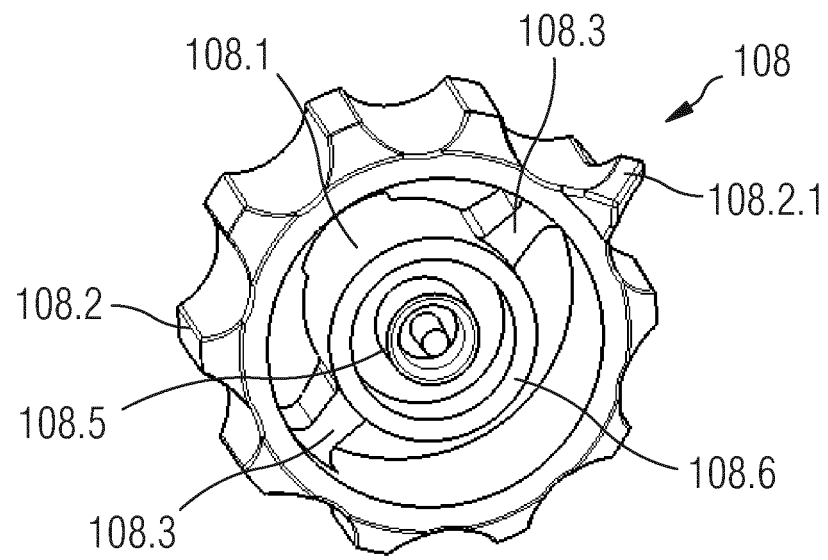
FIG. 18 is a lower perspective view of the rotating element of the valve of FIGS. 13 to 16, in accordance with various instances of the invention.

FIGS. 17 and 18 are two perspective views of the rotating ring 108. We can observe the two radially extending connectors 108.3 that rigidly connect the central portion 108.1 with the outer gripping ring 108.2. These two connectors 108.3 form then two arcuate slots through which the arms 104.1 (FIGS. 15 and 16) of the body extend. They are also advantageously diametrically opposed so that each of the two arcuate slots extends angularly over about 180° (less the thickness in a circumferential direction of the connectors 108.3). The connectors 108.3 show a reduced height compared with the height of the outer gripping ring 108.2 in order to allow the lower portion of the support element 110 with the annular outer surface 110.2 (FIGS. 13-16) and/or the upper annular portion 130.2 of the cover 130 (FIGS. 13-16) to fit into the outer gripping ring 108.2.

It is referred to the description of FIGS. 2 and 4 relating to the first exemplary embodiment, for the same or corresponding elements.

The invention claimed is:

1. A valve, said valve comprising:
 a body with an inlet, an outlet and a passage fluidly interconnecting the inlet and outlet;
 a shut-off device of the passage, with an actuating member movable along a longitudinal axis;
 a hand operating device of the actuating member, for selectively opening or closing the passage, and comprising a support element and a rotating element with at least one contact surface configured for sliding along at least one ramped surface on the support element, or vice versa, so as to convert rotation of the rotating element into a translation of the actuating member;
 wherein the body comprises two arms extending longitudinally and diametrically opposed relative to the longitudinal axis, with distal ends holding the support element;

wherein the support element is attached to the two arms by a pin extending transversally through the support element and distal ends provided with holes of the two arms.

2. The valve according to claim 1, wherein the rotating element is located at at least one of:
   between the two arms; and
   around the two arms.

3. The valve according to claim 2, wherein the rotating element comprises a handle radially extending between the two arms.

4. The valve according to claim 3, wherein the hand operating device further comprises a securing hook mounted on the support element and configured for engaging with the radially extending handle in the closed position of the passage.

5. The valve according to claim 4, wherein the securing hook is pivotally mounted on the pin.

6. The valve according to claim 3, wherein the rotating element comprises a central portion with a recessed upper face provided with the at least one contact or ramped surface and engaging in a rotatable manner with the support element.

7. The valve according to claim 6, wherein the central portion of the rotating element comprises an outer peripheral surface with a first area adjacent on one side to the radially extending handle and a second area adjacent on the other side to the radially extending handle, the first and second areas showing at least one of different colours and indicia so as to provide a visual indication of a closed/open state of the valve.

8. The valve according to claim 1, wherein the rotating element comprises a central portion and outer gripping ring connected to the central portion by two radially extending connectors so as to form two arcuate slots, the two arms extending through the slots.

9. The valve according to claim 8, wherein the central portion comprises a recessed upper face provided with the at least one contact or ramped surface and engaging in a rotatable manner with the support element.

10. The valve according to claim 8, wherein the support element comprises an annular outer surface that fits inside an upper side of the outer gripping ring such that the annular outer surface is selectively covered or uncovered by the outer gripping ring upon actuation in rotation of the rotating element, the annular outer surface showing at least one of a colour and indicia so as to provide a visual indication of a closed/open state of the valve.

11. The valve according to claim 1, wherein the support element is generally disk-shaped with an inner face provided with the at least one contact or ramped surface.

12. The valve according to claim 1, wherein the rotating element comprises a lower face engaging in a rotatable manner with an upper portion of the body.

13. The valve according to claim 12, wherein the lower face of the rotating element comprises a protruding portion engaging in a slidable manner with a bore formed in the upper portion of the body.

14. The valve according to claim 13, wherein the actuating member extends through the bore in the upper portion of the body.

15. The valve according to claim 12, wherein the lower face of the rotating element comprises a sleeve surrounding the upper portion of the body.

16. The valve according to claim 15, wherein the upper portion of the body is formed by a circular element with an outer thread engaging with an inner thread in a main element of the body and with an outer non-circular surface such as to be able to engage in rotation with a tool for tightening the outer thread with the inner thread, the outer non-circular surface engaging in a slidable manner with the sleeve of the rotating element.

17. The valve according to claim 1, wherein the shut-off device of the passage comprises a seat in the passage and a closing element configured for cooperating with the seat on an upstream side of the seat, the actuating member being configured for moving the closing element away from the seat for opening the passage.

18. The valve according to claim 17, wherein the seat is a pilot seat formed on a main closing element configured for cooperating with a main seat in the passage and formed on the body, the closing element being a pilot closing element with a stem extending through the main closing element to a downstream side of the main closing element.

19. The valve according to claim 1, wherein the actuating member extends through a longitudinal cavity in the body and comprises a lower portion with a transversal opening crossed by a piston biased by a spring against an outlet seat in the body, downstream of the shut-off device, the piston, the spring and outlet seat being configured for forming a residual pressure device.

20. A valve, said valve comprising:
   a body with an inlet, an outlet and a passage fluidly interconnecting the inlet and outlet;
   a shut-off device of the passage, with an actuating member movable along a longitudinal axis;
   a hand operating device of the actuating member, for selectively opening or closing the passage, and comprising a support element and a rotating element with at least one contact surface configured for sliding along at least one ramped surface on the support element, or vice versa, so as to convert rotation of the rotating element into a translation of the actuating member;
   wherein the body comprises two arms extending longitudinally and diametrically opposed relative to the longitudinal axis, with distal ends holding the support element;
   wherein the rotating element comprises a central portion and an outer gripping ring connected to the central portion by two radially extending connectors so as to form two arcuate slots, the two arms extending through the slots.

* * * * *